United States Patent Office 2,766,612
Patented Oct. 16, 1956

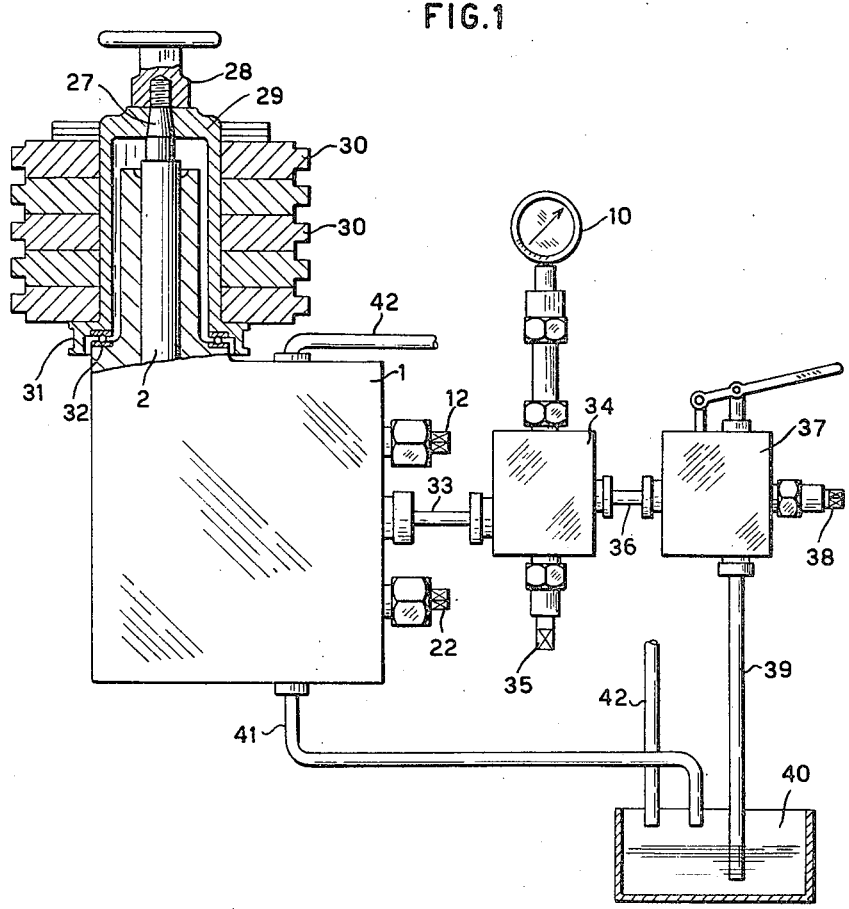

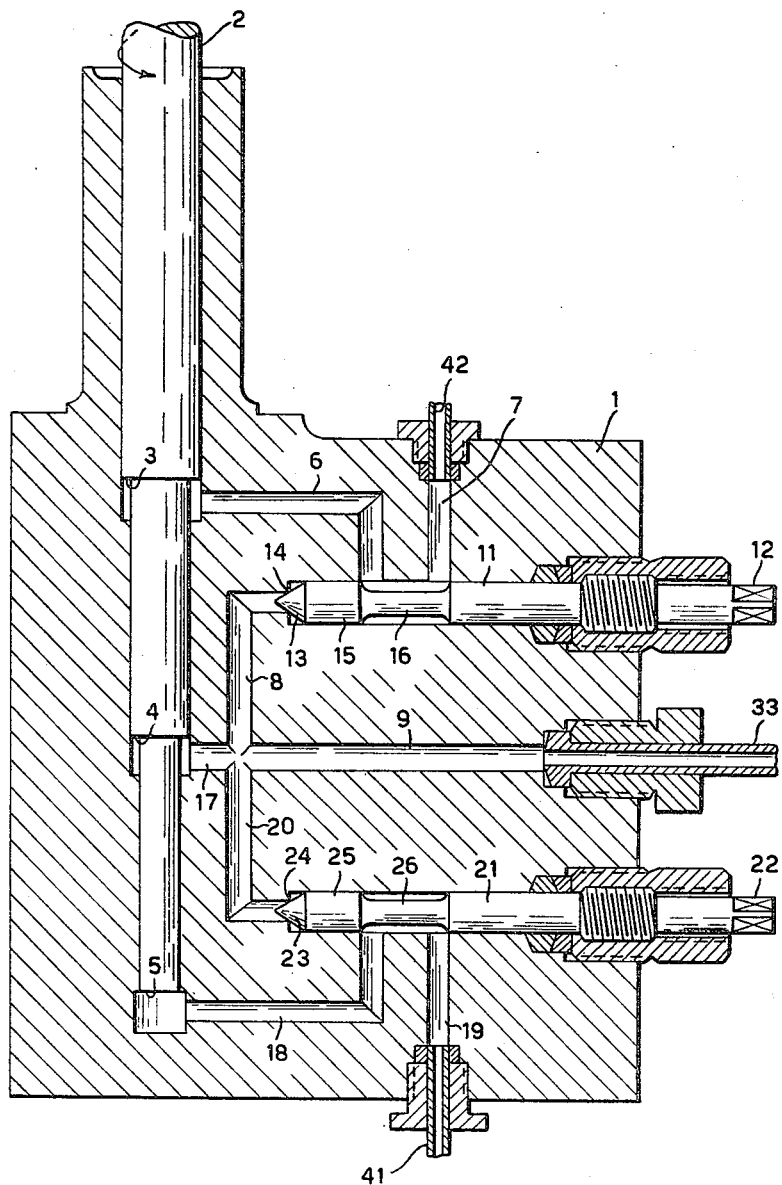

2,766,612

TESTING DEVICE FOR FLUID PRESSURE GAUGE

Antonius M. J. F. Michels, Amsterdam, Netherlands, assignor to W. C. 't Hart & Zn Instrumenten-en Apparatenfabriek N. V., Rotterdam, Netherlands, a limited liability company of Netherlands Application January 13, 1954, Serial No. 403,894

6 Claims. (Cl. 73—4)

In its general aspects the present invention relates to a valve block for a hydraulic pressure measuring device, its general object being to provide unusually simple, positive and effective means for obtaining a desired range of pressures and for accurately indicating the obtained pressure. Such a pressure measuring device serves for gauging manometers and is preferably adjustable for various pressures for obtaining the required degree of accuracy.

The two-step embodiment of such a pressure measuring device is generally known. For accurate measurements, however, it is impossible to use a two-step plunger for great pressure difference. The present device was designed to obtain one apparatus having a large measuring range, e. g. from zero up to 7110 lbs./sq. in. and comprising a three-step plunger, this apparatus giving the possibility to carry out very accurate measurements on manometers.

In addition to a very accurate finish of the housing and the plunger a special system of passages and valves is provided so as to achieve the required combination with a minimum number of operating means.

It is the object of the present invention to provide such a pressure measuring device.

According to the present invention in a hydraulic pressure measuring device a valve block is provided comprising a plunger the displacement of which provides a measuring indication. The plunger has three pressure surfaces and passages or bores, said passages or bores interconnecting said pressure surfaces with a pressure orifice and the atmosphere, further comprising valve elements, said valve elements being arranged in said passages or bores for putting into operation or for rendering inoperative and controlling said pressure surfaces, said valve elements being adapted to be operated by means of two operating or controlling members.

Still other objects will be apparent from the following specification and from the accompanying drawings, in which drawings:

Fig. 1 is a general view, partly in section showing the hydraulic pressure measuring device according to the present invention.

Fig. 2 is an enlarged and central vertical section through the valve block of the novel pressure measuring device.

Figure 3A:
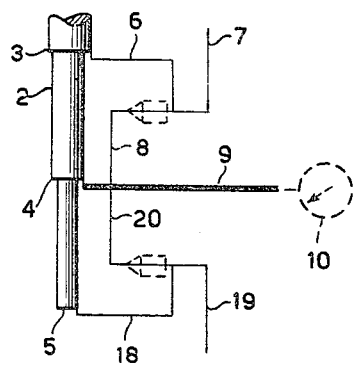
Figure 3B:
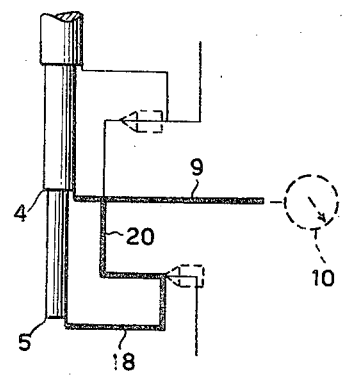
Figure 3C:
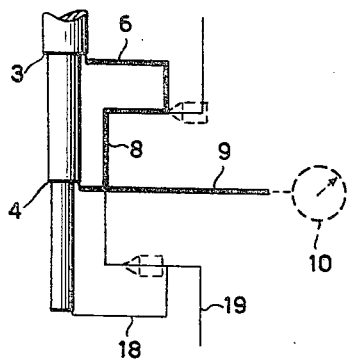
Figure 3D:
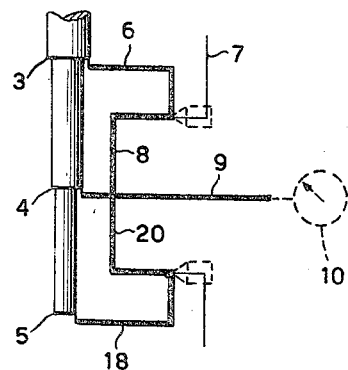

The Figs. 3a–3d show the various measuring ranges which can be obtained by adjusting the two valve members.

In the arrangement of Fig. 1 the valve block 1 contains the plunger 2 on which the gauge weight G (Fig. 2) is supported. This weight G is composed of weight discs 30 suspended on a cap 29, which is rotated by means of a pulley 31 and a tape not shown. The rotation of the plunger 2 is necessary because the plunger is not allowed to have a dry friction in the housing block 1. Further the plunger and the gauge weights must float during the measuring operation. Before the floating takes place the cap is supported on the housing block by means of roller bearings 32. On top of the cap a handwheel 28 is screwed so that the cap and its weights may be easily removed. The cap 29 has a conical opening at the top which rests on conical section 27 of the plunger 2. The operating surfaces of the plunger 2 are indicated as elements 3, 4 and 5 (Fig. 2).

The surface 3 of plunger 2 may be exposed by means of the passages 6 and 7 and the connection 42 to the atmosphere and by means of the passages 6, 8, 9 to the instrument 10 to be gauged through the connection 33 and the instrument block 34. In this system of passages a valve element 11 is arranged that can be operated by means of a squared portion 12 from the outside. This valve element 11 has a conical cut-off surface 13 by means of which in cooperation with the corresponding seat 14 the connection with the passages 8 and 9 to the instrument 10 to be gauged can be shut off. The valve element 11 further has a cylindrical body 15 which provides for the guidance and a further shutting off. Said cylindrical body 15 has a portion 16 with a smaller diameter which is carried out with such a length that if the passage to the instrument 10 to be gauged is closed the connecting passage 7 with the atmosphere is open.

The operative pressure surface 4 is exposed by a passage 17 to the passages 8 and 9.

The operative pressure surface 5 is exposed to the atmosphere by means of the passages 18 and 19 through the connection 41 and by means of the passages 18, 20, 9 to the instrument 10 to be gauged. In this system of passages there is also a valve element 21 which can be operated from the outside by means of a squared portion 22. The valve element 21 has a conical cut-off surface 23 whereby in cooperation with the corresponding seat 24 the connection with the passages 18 and 20 to the instrument 10 to be gauged can be shut off. Said valve element 21 further has a cylindrical body 25 providing for the guidance and further cutting off. Said cylindrical body 25 has a portion 26 with a smaller diameter which has such a length that, if the passage to the instrument 10 to be gauged is closed, the connection 19 with the atmosphere is open.

Four different positions of the two valve elements are possible, and thus four pressure steps are available. If there is a predetermined load on the plunger 2 by certain positions of the valve elements a very accurate predetermined pressure can be obtained. By means of the valve elements the different surfaces of the plunger can be put into operation. By rendering inoperative a certain amount of measuring surface said surface is connected with the atmosphere so that all pressure disappears.

The system is pressurized by means of a pump 37 which is connected by means of the tube 36 of the block 34, the instrument can be separated from the system by means of a valve in the block 34 which is controlled from the outside by means of the squared portion 35. The pump 37 can be shut off by means of a valve which is operated from the outside by means of the squared portion 38. Hydraulic fluid is sucked into the system by the pump 37 through the tube 39 from the tank 40 in which also the tubes 41 and 42 drain.

By various settings of the valves 13 and 23, four different pressure ratios can be obtained: (a) With valves 14 and 23 closed (Figure 3a), only surface 4 of the piston receives pressure; (b) by opening valve 25 (Figure 3b), surfaces 4 and 5 receive pressure; (c) by closing valve 23 and opening valve 13 (Figure 3c) surfaces 4 and 3 receive pressure, surface 3 having a larger area than surface 5; (d) by opening both valves 13 and 123 (Figure 3d) all surfaces 3, 4 and 5 receive pressure.

Thus, three broad bands of pressure range may be selected by opening and/or closing appropriate valves 13 and 23: (a) one annular surface only; (b) two surfaces 4 and 5 or (c) a slightly different range by using two surfaces 4 and 3; (d) three surfaces, 3, 4 and 5.

What is claimed is:

1. In apparatus for testing pressure gauges; a cylinder block having a plurality of vertical axially aligned cylinders; a common plunger for said cylinders, said common plunger having a longitudinal vertical axis extending along the aligned axes of said cylinders; said plunger extending above said cylinder block; means for supporting a plurality of weights of known mass at the portion of the plunger extending above said cylinder block; said plunger having a plurality of piston surfaces each of different area; each of said aligned cylinders containing a portion of said plunger having one piston surface; passages in said cylinder block interconnecting said cylinders; means for connecting said passages to a source of pressure and an instrument to be tested; valve means disposed in said passages to control and selectively connect one or more of said cylinders to the source of pressure and the instrument to be tested.

2. In apparatus for testing pressure gauges; a cylinder block having three vertical axially aligned cylinders; a common plunger for said cylinders, said common plunger having a longitudinal vertical axis extending along the aligned axes of said cylinders; said plunger extending above said cylinder block; means for supporting a plurality of weights of known mass at the portion of the plunger extending above said cylinder block; said plunger having a plurality of piston surfaces each of different area; each of said aligned cylinders containing a portion of said plunger having one piston surface; passages in said cylinder block interconnecting said cylinders; means for connecting said passages to a source of pressure and an instrument to be tested; valve means disposed in said passages to control and selectively connect one, two or three of said cylinders to the source of pressure and the instrument to be tested.

3. In apparatus for testing pressure gauges; a cylinder block having three vertical axially aligned cylinders; a common plunger for said cylinders, said common plunger having a longitudinal vertical axis extending along the aligned axes of said cylinders; said plunger extending above said cylinder block; means for supporting a plurality of weights of known mass at the portion of the plunger extending above said cylinder block; said plunger having a plurality of piston surfaces each of different area; each of said aligned cylinders containing a portion of said plunger having one piston surface; passages in said cylinder block interconnecting said cylinders; means for connecting said passages to a source of pressure and an instrument to be tested; valve means disposed in said passages to control and selectively connect one, two or three of said cylinders to the source of pressure and the instrument to be tested, said passages comprising three cylinder passages each connected to one of the cylinders below the piston surface in said cylinder and a fourth passage interconnecting the passages for the first and second cylinders and a fifth passage interconnecting the passages for the second and third cylinders.

4. In apparatus for testing pressure gauges; a cylinder block having three vertical axially aligned cylinders; a common plunger for said cylinders, said common plunger having a longitudinal vertical axis extending along the aligned axes of said cylinders; said plunger extending above said cylinder block; means for supporting a plurality of weights of known mass at the portion of the plunger extending above said cylinder block; said plunger having a plurality of piston surfaces each of different area; each of said aligned cylinders containing a portion of said plunger having one piston surface; passages in said cylinder block interconnecting said cylinders; means for connecting said passages to a source of pressure and an instrument to be tested; valve means disposed in said passages to control and selectively connect one, two or three of said cylinders to the source of pressure and the instrument to be tested, said passages comprising three cylinder passages each connected to one of the cylinders below the piston surface in said cylinder and a fourth passage interconnecting the passages for the first and second cylinders and a fifth passage interconnecting the passages for the second and third cylinders; said valve means comprising one valve in said fourth passage arranged when closed to disconnect the passage between the first and second cylinder and a second valve in the fifth passage arranged when closed to disconnect the passage between the second and third cylinders.

5. In apparatus for testing pressure gauges; a cylinder block having three vertical axially aligned cylinders; a common plunger for said cylinders, said common plunger having a longitudinal vertical axis extending along the aligned axes of said cylinders; said plunger extending above said cylinder block; means for supporting a plurality of weights of known mass at the portion of the plunger extending above said cylinder block; said plunger having a plurality of piston surfaces each of different area; each of said aligned cylinders containing a portion of said plunger having one piston surface; passages in said cylinder block interconnecting said cylinders; means for connecting said passages to a source of pressure and an instrument to be tested; valve means disposed in said passages to control and selectively connect one, two or three of said cylinders to the source of pressure and the instrument to be tested, said passages comprising three cylinder passages each connected to one of the cylinders below the piston surface in said cylinder and a fourth passage interconnecting the passages for the first and second cylinders and a fifth passage interconnecting the passages for the second and third cylinders; said valve means comprising one valve in said fourth passage arranged when closed to disconnect the passage between the first and second cylinder and a second valve in the fifth passage arranged when closed to disconnect the passage between the second and third cylinders, said first valve when closed connecting the first cylinder to atmosphere, said second valve when closed connecting the third cylinder to atmosphere; the means for connecting the passages to the source of pressure and an instrument to be tested being connected to the passage for the second cylinder.

6. In apparatus for testing pressure gauges; a cylinder block having three vertical axially aligned cylinders; a common plunger for said cylinders, said common plunger having a longitudinal vertical axis extending along the aligned axes of said cylinders; said plunger extending above said cylinder block; means for supporting a plurality of weights of known mass at the portion of the plunger extending above said cylinder block; said plunger having a plurality of piston surfaces each of different area; each of said aligned cylinders containing a portion of said plunger having one piston surface; passages in said cylinder block interconnecting said cylinders; means for connecting said passages to a source of pressure and an instrument to be tested; valve means disposed in said passages to control and selectively connect one, two or three of said cylinders to the source of pressure and the instrument to be tested, said passages comprising three cylinder passages each connected to one of the cylinders below the piston surface in said cylinder and a fourth passage interconnecting the passages for the first and second cylinders and a fifth passage interconnecting the passages for the second and third cylinders; said valve means comprising one valve in said fourth passage arranged when closed to disconnect the passage between the first and second cylinder and a second valve in the fifth passage arranged when closed to disconnect the passage between the second and third cylinders, said first valve when closed connecting the first cylinder to atmosphere, said second valve when closed connecting the third cylinder to atmosphere; the means for connecting the passages to the source of pressure and an instrument to be tested being connected to the passage for the second cylinder, the closing of both valves connecting the second cylinder to the source of pressure and the instrument to be tested; the opening of the second valve connecting the second and third cylinders; the opening of the first valve and closing of the second valve connecting the first and second cylinders; and the opening of both valves connecting the three cylinders to the source of pressure and the instrument to be tested.

References Cited in the file of this patent

UNITED STATES PATENTS

| | | |
|---|---|---|
| 285,883 | Fisher | Oct. 2, 1883 |
| 747,772 | Rickman | Dec. 22, 1903 |
| 1,154,018 | Hopkins | Sept. 21, 1915 |
| 2,072,912 | Heydekampf | Mar. 9, 1937 |
| 2,135,721 | Landenberger | Nov. 8, 1938 |

FOREIGN PATENTS

| | | |
|---|---|---|
| 394,150 | Germany | Apr. 23, 1924 |
| 596,043 | Great Britain | Dec. 24, 1947 |